(12) United States Patent
Yamaoku

(10) Patent No.: US 7,689,299 B2
(45) Date of Patent: Mar. 30, 2010

(54) ROTARY WORK LIFTER AND WORKING MACHINE

(75) Inventor: Hiroaki Yamaoku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1181 days.

(21) Appl. No.: 10/555,660

(22) PCT Filed: Mar. 12, 2004

(86) PCT No.: PCT/JP2004/003317

§ 371 (c)(1),
(2), (4) Date: Nov. 4, 2005

(87) PCT Pub. No.: WO2005/087432

PCT Pub. Date: Sep. 22, 2005

(65) Prior Publication Data

US 2007/0067070 A1    Mar. 22, 2007

(51) Int. Cl.
*G05B 19/18* (2006.01)
*G06F 19/00* (2006.01)

(52) U.S. Cl. .......................................... 700/60; 700/114

(58) Field of Classification Search .................. 700/60, 700/114, 170
See application file for complete search history.

(56) References Cited

U.S. PATENT DOCUMENTS 6,324,880 B1   12/2001   Nakamura 6,430,476 B1 *   8/2002   Schwaar et al. ............. 700/251
6,668,202 B2 *   12/2003   Makino et al. ................ 700/56

FOREIGN PATENT DOCUMENTS

| DE | 101 42 739 A1 | 3/2003 |
|---|---|---|
| JP | 6-233 Y2 | 1/1994 |
| JP | 7-15670 Y2 | 4/1995 |
| JP | 9-66392 A | 3/1997 |
| JP | 2000-312935 A | 11/2000 |
| JP | 2001-047342 A | 2/2001 |
| JP | 2002-211376 A | 7/2003 |

OTHER PUBLICATIONS

Chinese Office Action dated Jan. 4, 2008.
Japanese Notification of Reason for Refusal dated Jan. 26, 2010, in corresponding Japanese Patent Application No. 2006-519086.

* cited by examiner

*Primary Examiner*—Ryan A Jarrett
(74) *Attorney, Agent, or Firm*—Sughrue Mion, PLLC

(57) ABSTRACT

The invention is provided with means for detecting a situation of rotating a rotary work lifter at any time, and a determining portion for determining whether operation of the rotary work lifter is to be stopped by a state of rotating the rotary work lifter detected by the means, thereby, operation of the rotary work lifter can be stopped when rotation of the rotary work lifter is interrupted by pinching a work piece or the like between the rotary work lifter and a working table or the like, or when the rotation is interrupted by some other influence. Therefore, the rotary work lifter, the working table or the like can be prevented from being finally destructed by continuing to generate a torque by a drive source even after interrupting rotation of the rotary work lifter as in a background art.

27 Claims, 13 Drawing Sheets

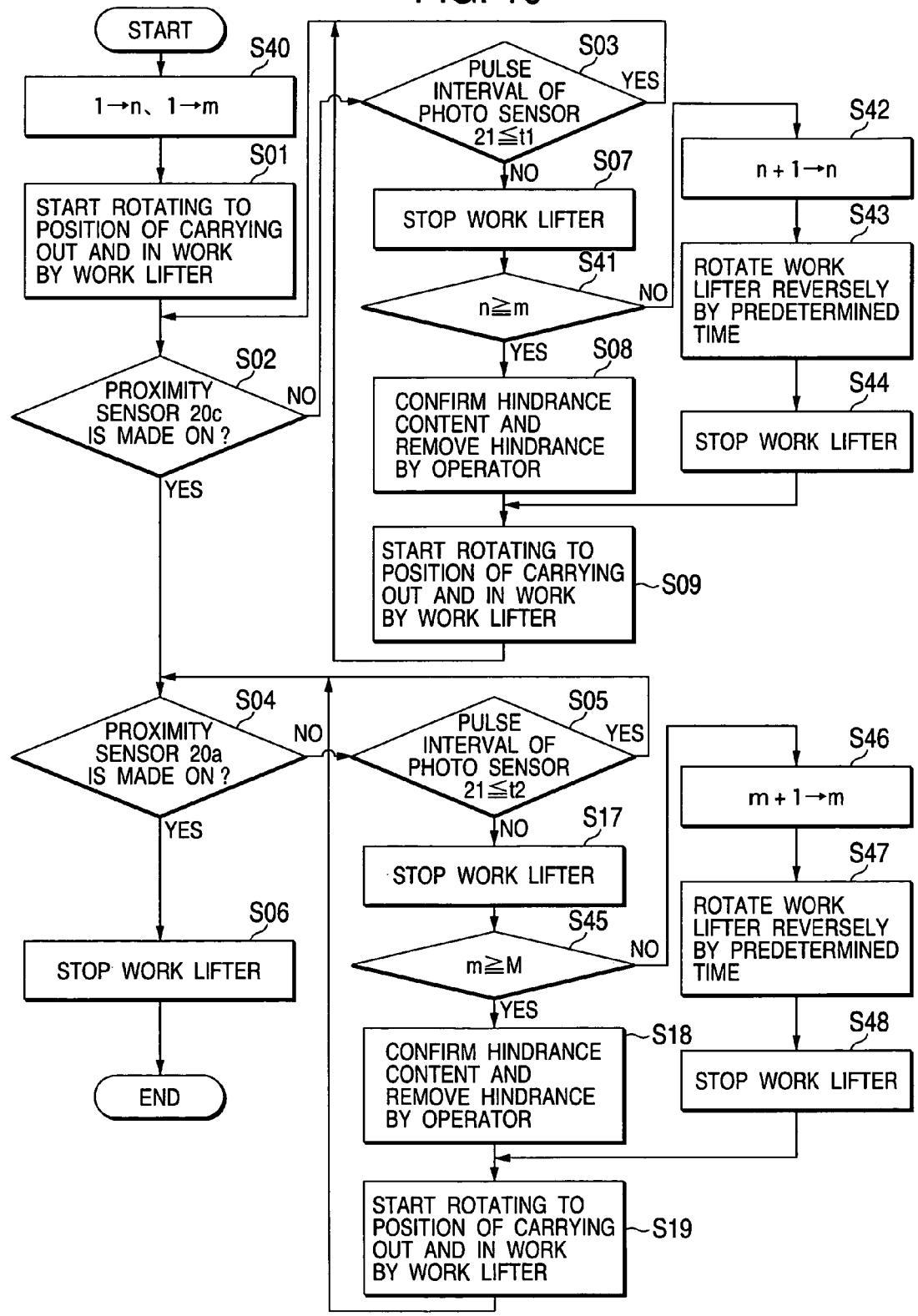

ROTARY WORK LIFTER AND WORKING MACHINE

TECHNICAL FIELD

The present invention relates to a rotary work lifter facilitating to carry in and out a work onto and from a working table of a working machine and a working machine having a rotary work lifter enabling to prevent a rotary work lifter, a working table or the like from being destructed by pinching a work piece between the rotary work lifter and the working table or the like in rotating the rotary work lifter.

BACKGROUND ART

There is a laser working machine of a background art having a work lifter of a rotary type at a working table and constituted to be easily able to carry in or carry out a work onto and from the working table by rotating the rotary work lifter by 180° as disclosed in JP-UM-B-6-233.

Meanwhile, when a workpiece or the like is pinched between a rotary work lifter and a working table or the like in the midst of rotating the rotary work lifter, the rotary work lifter cannot be rotated further and rotation thereof is interrupted, and when a drive source of the rotary work lifter continues generating a torque as it is, the rotary work lifter or the working table is finally destructed. Therefore, when rotation of the rotary work lifter is interrupted, the rotation needs to stop.

However, the rotary work lifter of the background art is not provided with means for detecting a situation of rotating the rotary work lifter at any time and therefore, even when rotation of the rotary work lifter is interrupted by pinching a work piece or the like, the interruption cannot be detected. Therefore, there poses a problem that since a position of finishing the rotation is not reached, the drive source continues generating the torque, and the rotary work lifter, the working table or the like is finally destructed.

The invention has been carried out in order to resolve the problem to provide a rotary work lifter having a protecting apparatus for preventing a rotary work lifter, a working table or the like from being destructed by pinching a workpiece between the rotary work lifter and the working table or the like and a working machine having the rotary work lifter.

DISCLOSURE OF THE INVENTION

In a rotary work lifter and a working machine according to the invention, means for detecting a situation of rotating the rotary work lifter at any time, and a determining portion for determining whether operation of the rotary work lifter is to be stopped by a state of rotating the rotary work lifter detected by the means are provided. The detecting means detects a value indicating the situation of rotating the rotary work lifter and outputs a detected value to the determining portion and when the determining portion determines that there is a possibility of interrupting rotation of the rotary work lifter by the inputted value, the determining portion transmits a signal to a control apparatus of the rotary work lifter to stop operating the rotary work lifter to thereby stop the rotary work lifter.

According to the invention, by providing the detecting means and the determining portion, when rotation of the rotary work lifter is interrupted by pinching a work piece or the like between the rotary work lifter and a working table or the like, or when rotation is interrupted by some other influence, operation of the rotary work lifter can be stopped. Therefore, the rotary work lifter, the working table or the like can be prevented from being destructed finally, by continuing to generate a torque by a drive source even after interruption of rotation of the rotary work lifter as in the background art. Further, since destruction of the rotary work lifter, the working table or the like can be prevented and therefore, expense or time required for repairing in destruction can be reduced and reduction in operational cost and promotion of working efficiency of the working machine can be realized.

BRIEF DESCRIPTION OF THE DRAWINGS

FIG. 16 is a flowchart showing a control method of a rotary work lifter showing Embodiment 4 of the invention.

BEST MODE FOR CARRYING OUT THE INVENTION

Embodiment 1

Figure 1:
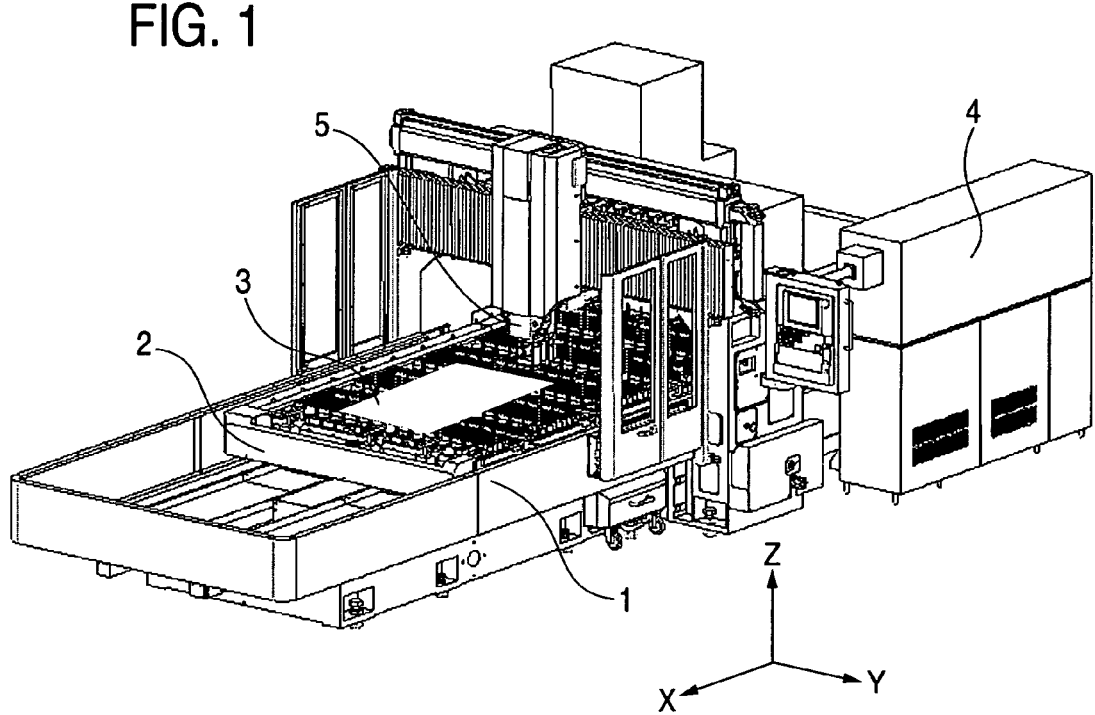
FIG. 1 is a perspective view showing a laser working machine having a rotary work lifter showing Embodiment 1 of the invention.
Figure 2:
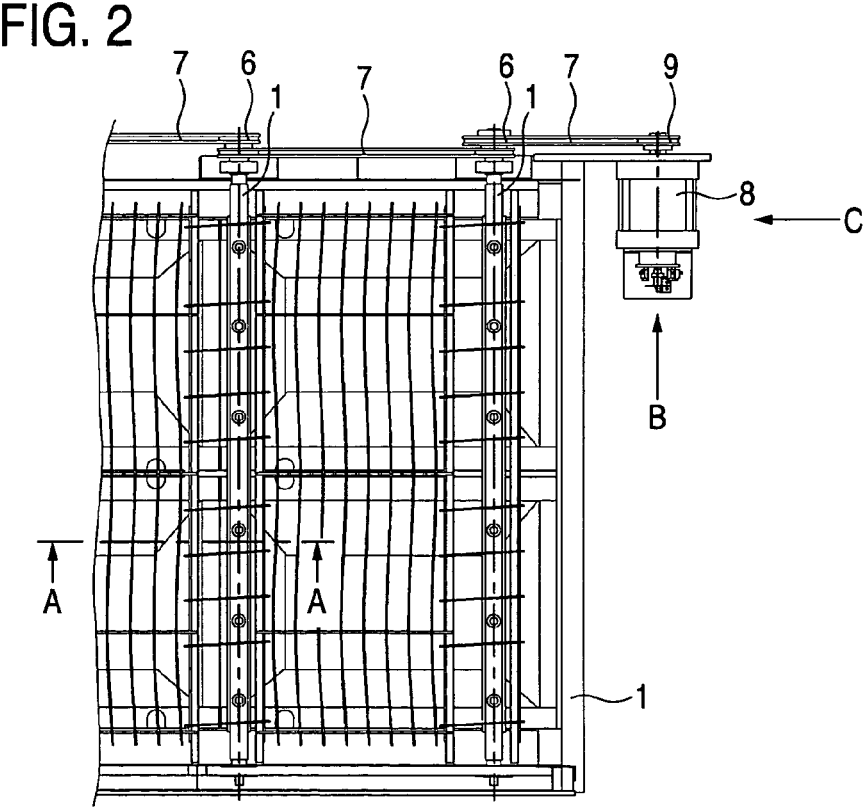
FIG. 2 is a partial plane view showing a working table of a laser working machine having the rotary work lifter showing Embodiment 1 of the invention.
Figure 3A:
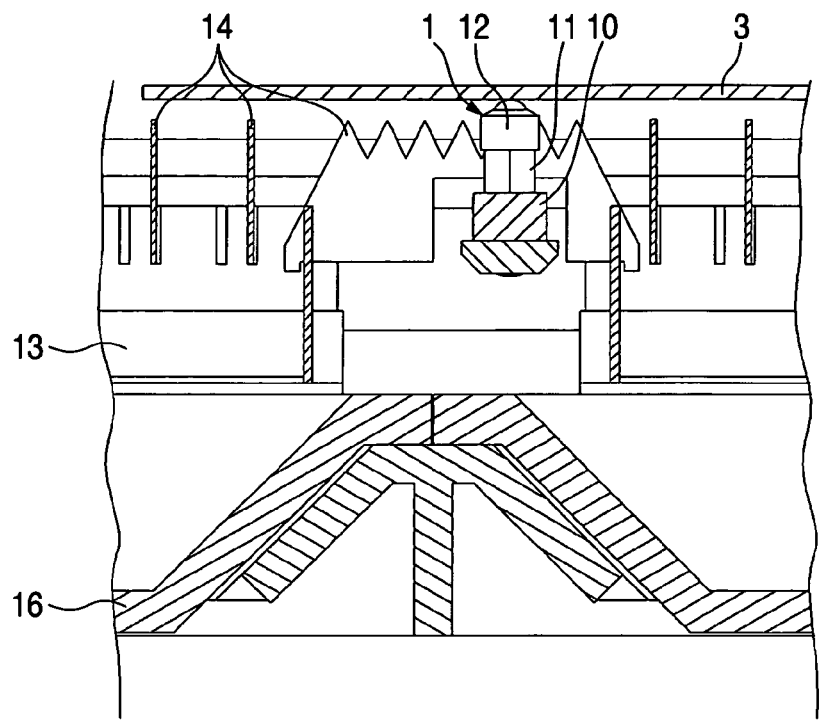
FIGS. 3A to 3D illustrate views enlarging an A-A section of FIG. 2 showing the rotary work lifter showing Embodiment 1 of the invention.
Figure 3B:
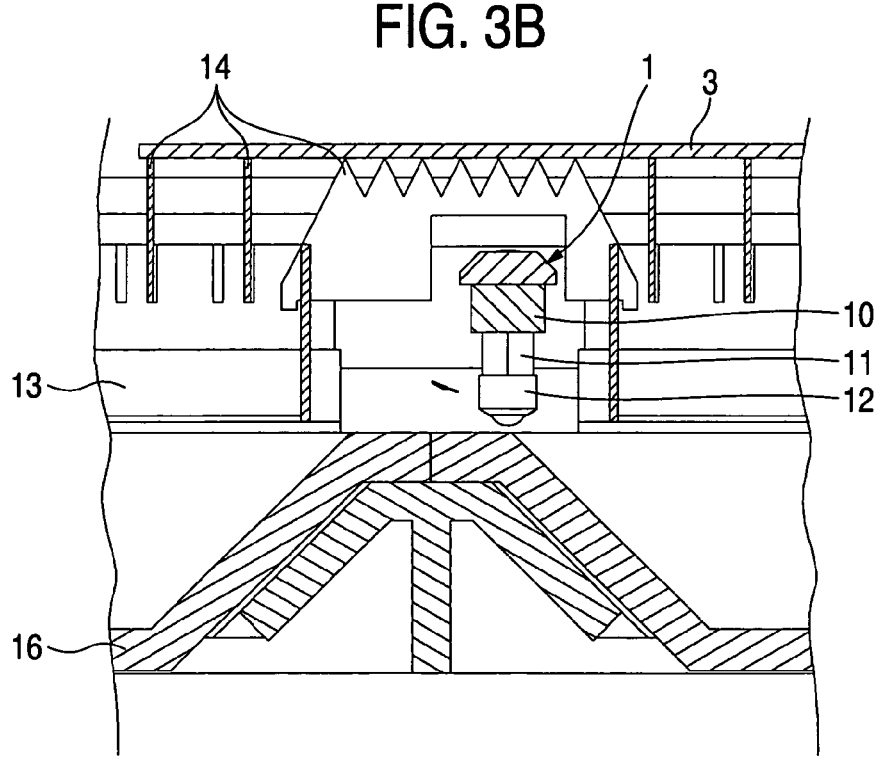
Figure 3C:
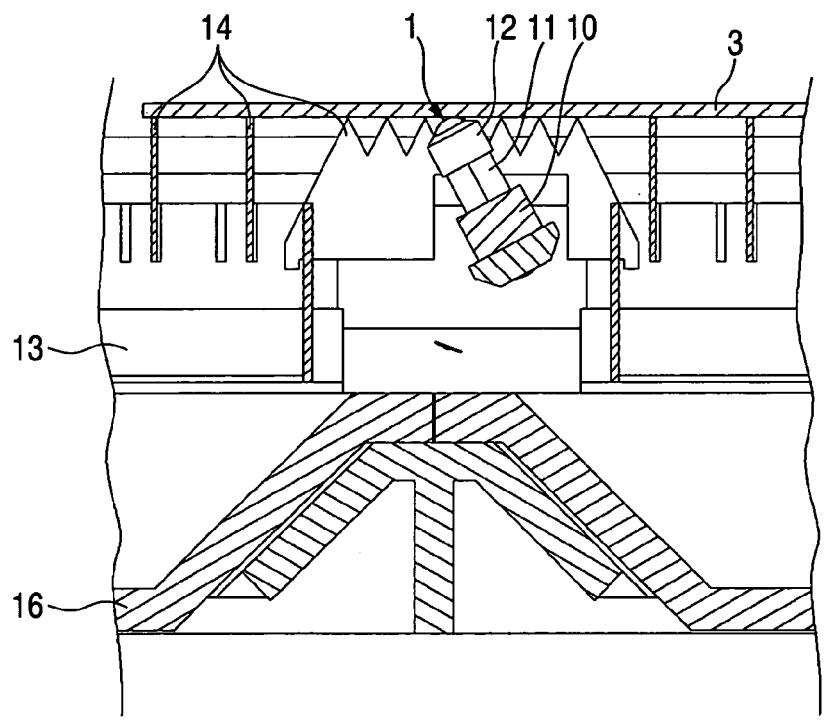
Figure 3D:
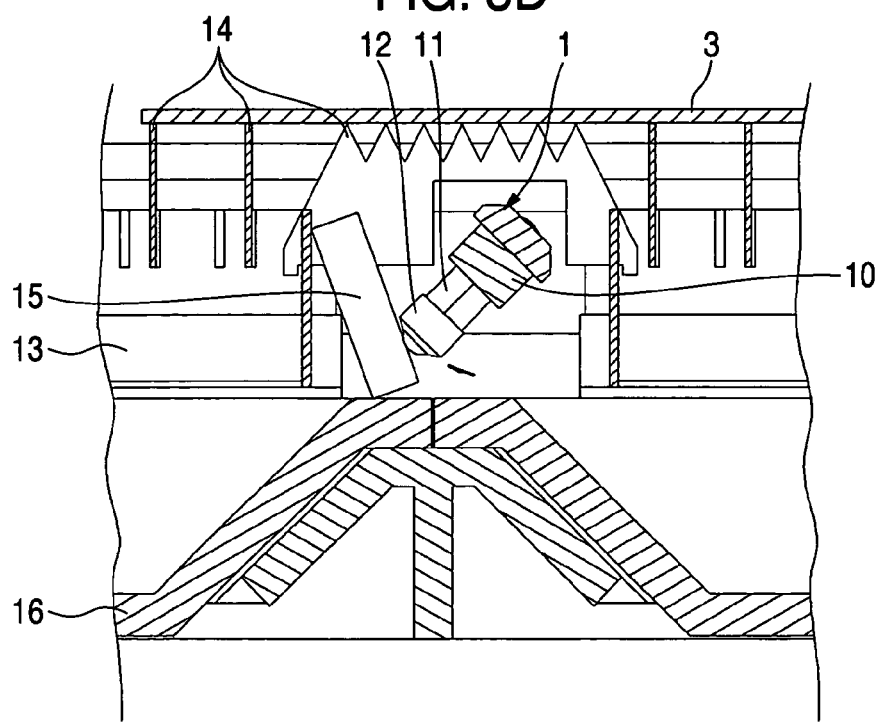
Figure 4:
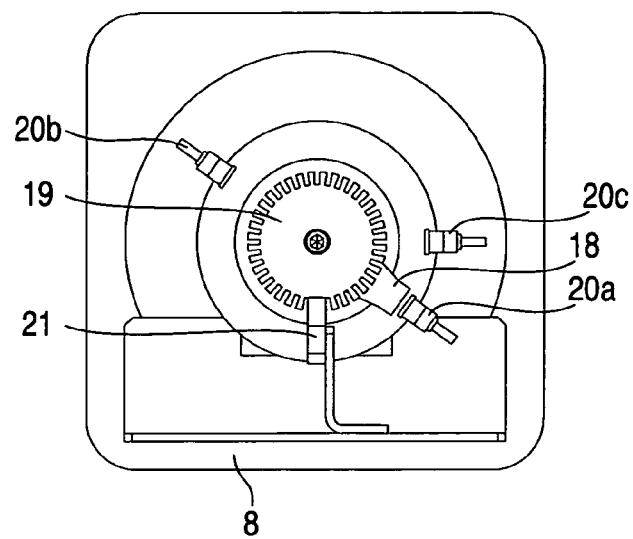
FIG. 4 is a front enlarged view viewing in B arrow mark direction of FIG. 2 showing the rotary work lifter showing Embodiment 1 of the invention.
Figure 5:
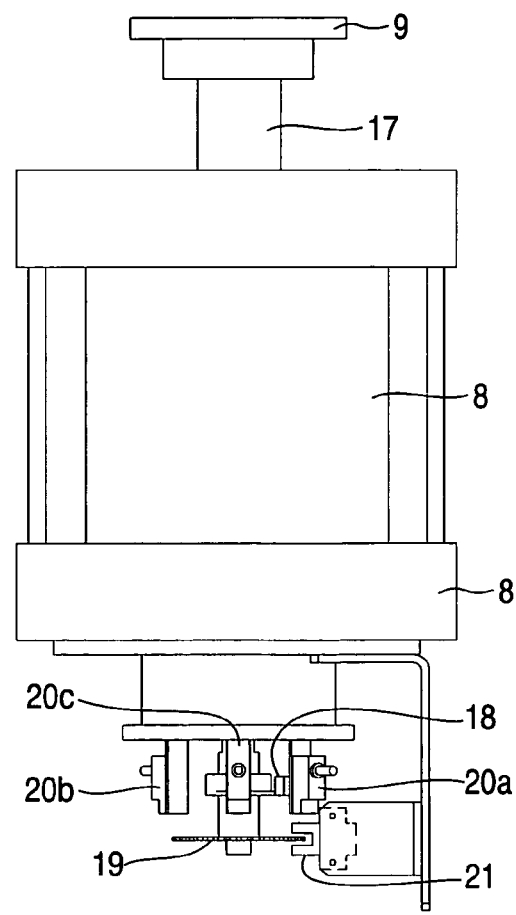
FIG. 5 is a side enlarged view viewing in C arrow mark direction of FIG. 2 showing the rotary work lifter showing Embodiment 1 of the invention.
Figure 6:
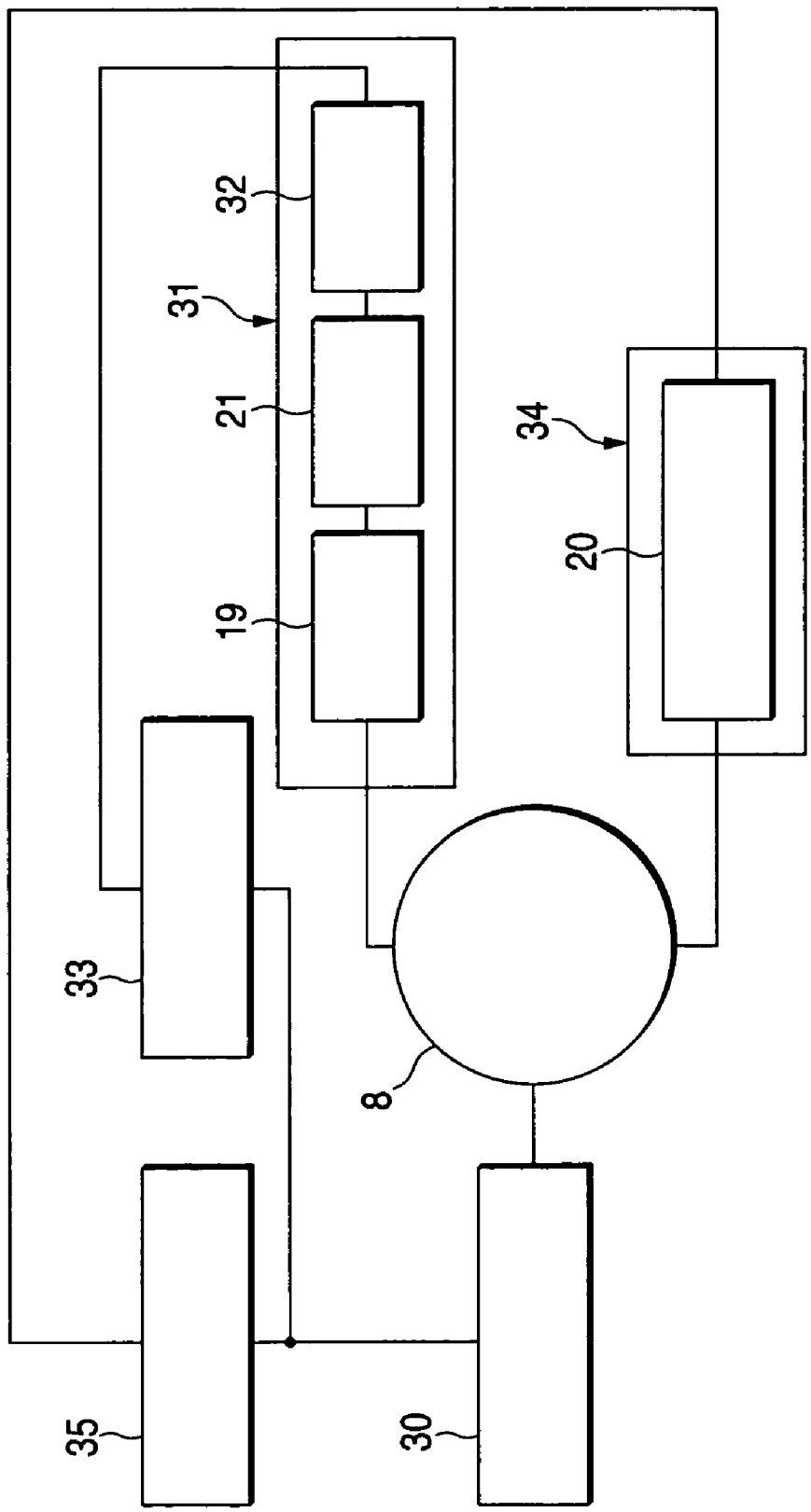
FIG. 6 is a block diagram showing a control portion of the rotary work lifter showing Embodiment 1 of the invention.
Figure 7:
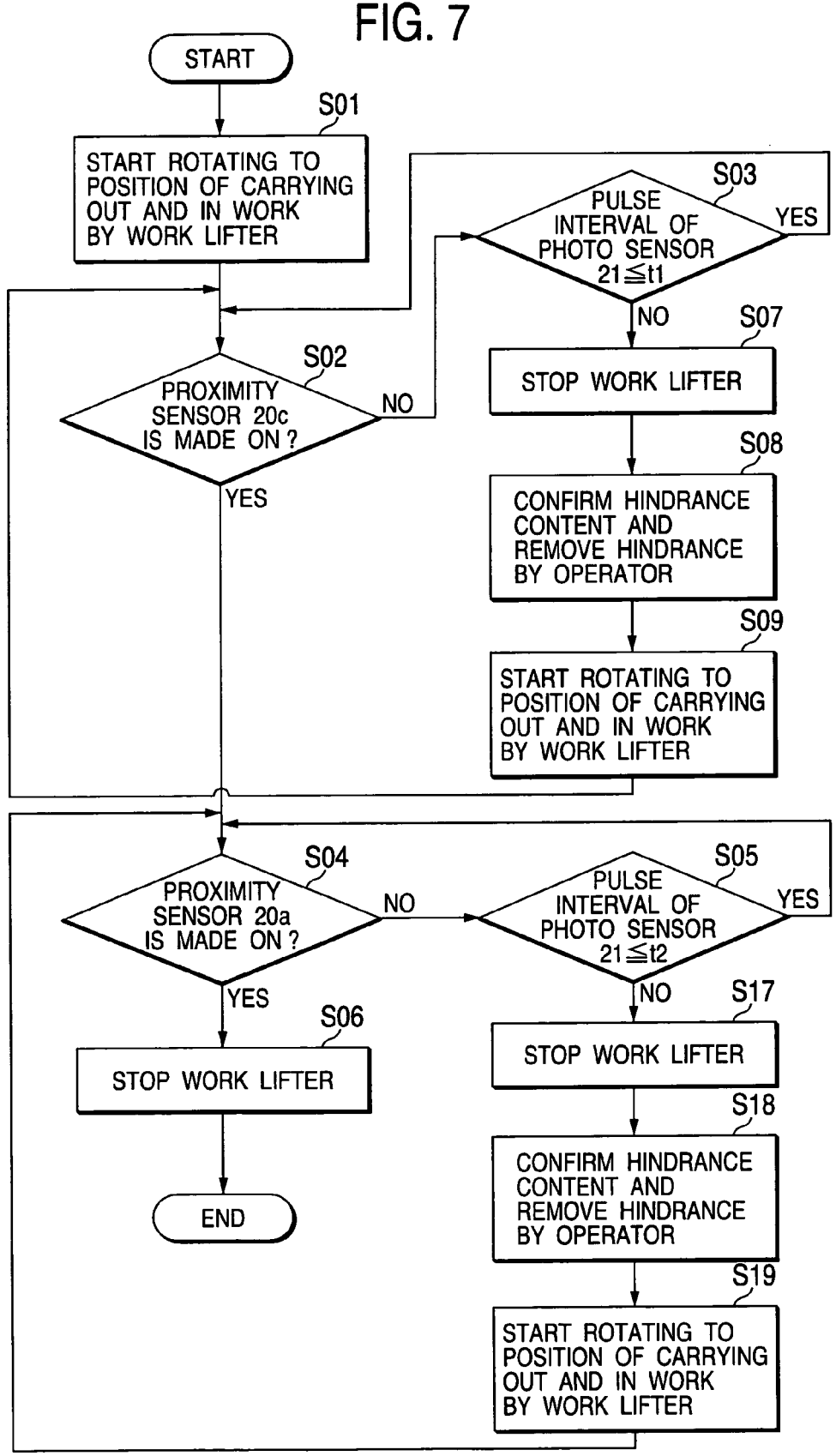
FIG. 7 is a flowchart showing a control method of the rotary work lifter showing Embodiment 1 of the invention.

FIG. 1 is a perspective view showing a plate material laser working machine attached with a rotary work lifter according to Embodiment 1 for embodying the invention. FIG. 2 is a plane view viewing a working table 2 of the plate material laser working machine of FIG. 1 from above. FIGS. 3A to 3D illustrate sectional views taken along a line A-A of FIG. 2 and enlarged views of a rotary work lifter 1 showing a single piece of rotary work lifter. FIG. 3A is a view showing a position of the rotary work lifter when a work is carried in or carried out, FIG. 3B is a view showing a position of the rotary work lifter in working, FIG. 3C is a view showing a position at a time point at which the rotary work lifter lifts a work, and FIG. 3D is a view in which a work piece is pinched between the rotary work lifter and a working table and rotation thereof is interrupted. FIG. 4 is a view viewing FIG. 2 in a B arrow mark direction and is a view viewing means for detecting a rotating situation of the rotary work lifter from a front side. FIG. 5 is a view viewing FIG. 2 in a C arrow mark direction and is a view viewing the means for detecting the rotating situation of the rotary work lifter from a side direction. FIG. 6 is a block diagram showing a control portion of the rotary work lifter according to Embodiment 1 for embodying the invention. FIG. 7 is a flowchart showing a control method of the control portion.

In FIG. 1, a work 3 is mounted on the working table 2 having the rotary work lifter 1 constituting a structure facilitating to carry in and carry out the work 3. The rotary work lifter 1 is provided with a protecting apparatus. A laser beam outputted from an oscillator 4 is guided to a work head 5 and is irradiated from the work head 5 to the work 3. The work table 2 can be moved in X-axis direction shown in FIG. 1 in a horizontal plane and the work head 5 can be moved in two axes directions of Y axis and Z axis shown in FIG. 1 in a plane orthogonal to an axis of moving the working table 2. The work 3 can be worked in a desired shape by the laser beam irradiated from the work head 5 by relatively moving the working table 2 and the work head 5.

Although in FIG. 1, an explanation has been given of Embodiment 1 according to the invention by showing the laser working machine having the rotary work lifter 1, the protecting apparatus of the rotary work lifter shown in Embodiment 1 is applicable to a plate material working machine of a gas cutting machine, a plasma cutting machine or the like when the plate material working machine is provided with the rotary work lifter to achieve a similar effect.

In FIG. 2, a plurality of pieces of the rotary work lifters 1 are attached to the working table 2 in parallel. Rotating shafts of the respective rotary work lifters 1 are attached with sprockets 6 and the sprockets 6 of the rotary work lifters 1 contiguous to each other are connected to each other by chains 7. Further, the sprocket 6 of the rotary work lifter 1 which is most proximate to a rotary actuator 8 constituting a drive source of the rotary work lifter 1 is connected to a sprocket 9 attached to a rotating shaft of the rotary actuator 8 by the chain 7. By connecting the rotary actuator 8 and the respective rotary work lifters 1 by the chains 7 via the sprockets 9, 6 in this way, the respective rotary work lifters 1 can be rotated in the same direction simultaneously with rotation of the rotary actuator 8. Here, the rotary actuator 8 constitutes a power source by fluid pressure of air pressure or oil pressure.

In FIGS. 3A to 3D, the rotary work lifter 1 is provided with a single piece of a shaft 10 held rotatably, a plurality of spacers 11 fixed to the shaft 10, extended orthogonally to the shaft 10, and aligned in parallel with each other and substantially at equal intervals, a free bearing 12 facilitating to move the work installed at front ends of the respective spacers 11, and the shaft 10 is rotated by the rotary actuator 8 shown in FIG. 2.

When the work is worked, according to the rotary work lifter, as shown by FIG. 3B, the shaft 10 is rotated such that the spacer 11 and the free bearing 12 are directed downwardly in a vertical direction. Since the spacer 11 and the free bearing 12 are directed downwardly, the work 3 is mounted on a work support 14 attached to a work support attaching plate 13 and working is carried out.

When the work is carried out or carried in onto or from the working table, according to the rotary work lifter, as shown by FIG. 3A, the shaft 10 is rotated from a position of FIG. 3B by about 180° such that the spacer 11 and the free bearing 12 are substantially directed upwardly in the vertical line. Since the spacer 11 and the free bearing 12 are directed upwardly and the free bearing 12 is projected upward from an upper end of the work support 14, the work 3 is mounted onto the free bearing 12. Thereby, the work 3 is facilitated to carry out and in from and to the working table.

When working is finished and the work 3 is carried out, the rotary work lifter 1 is rotated by 180° from a position shown in FIG. 3B to a position shown in FIG. 3A. Here, as shown in FIG. 3D when a work piece 15 is disposed at the work support attaching plate 13 or on a chute 16 of the working table 2, the rotary work lifter 1 pinches the work piece 15 between the free bearing 12 or the spacer 11 and the work support attaching plate 13 or the chute 16 and cannot be rotated from a position shown in FIG. 3D. At this occasion, when operation of the rotary work lifter 1 cannot be stopped at once, the rotary actuator 8 continues generating the torque to finally destruct the rotary work lifter 2 or the work support attaching plate 13 or the chute 16 of the working table 2.

In FIG. 4 and FIG. 5, a proximity sensor dog 18 and a light chopper 19 are attached to a rotating shaft 17 of the rotary actuator 8 on a side opposed to a side of being attached with the sprocket 9 and is rotated along with the rotating shaft 17. At a surrounding of the proximity sensor dog 18, three proximity sensors 20a, 20b, 20c are arranged on a circumference of rotating the proximity sensor dog 18 and at positions shown below. The first proximity sensor 20a is arranged at a position to be proximate to the proximity sensor dog 18 when the rotary work lifter 1 is disposed at the position of FIG. 3A, the second proximity sensor 20b is arranged at a position proximate to the proximity sensor dog 18 when the rotary work lifter 1 is disposed at the position of FIG. 3B, and the third proximity sensor 20c is disposed at a position proximate to the proximity sensor dog 18 when the rotary work lifter 1 is disposed at a position of FIG. 3C. Further, a photo sensor 21 is arranged to fix a position thereof to interpose the light chopper 19.

By such a constitution, as an effect of the proximity sensors 20a, 20b, 20c, when the rotary work lifter 1 is disposed at the position of carrying out and in the work shown in FIG. 3A, the proximity sensor dog 18 becomes proximate to the proximity sensor 20a, when the rotary work lifter 1 is disposed at the position in working shown in FIG. 3B, the proximity sensor dog 18 becomes proximate to the proximity sensor 20b, and when the rotary work lifter 1 is disposed at the position of being brought into contact with the work 3 shown in FIG. 3C, the proximity sensor dog 18 becomes proximate to the proximity sensor 20c and therefore, the respective positions can be detected. As the effect of the light chopper 19, when the rotating shaft 17 is rotated, that is, when the rotary work lifter 1 is rotated, by repeating ON/OFF by the photo sensor 21, a pulse is outputted from the photo sensor 21. Further, a time interval of the output pulse of the photo sensor 21 is a time period necessary for rotating the rotating shaft 3 by a constant angle and therefore, the time interval indicates a speed of rotation and therefore, rotational speed of whether the rotary work lifter 1 is rotated or stopped can be detected at any time from the time interval of the output pulse of the photo sensor 21.

As described above, by detecting a situation of rotating the rotary work lifter 1 at any time by the photo sensor 21 while detecting the position of the rotary work lifter 1 by the proximity sensors 20a, 20b, 20c, when interruption of rotation of the rotary actuator 8 is detected from the time interval of the output pulse of the photo sensor 21 until the rotary work lifter 1 reaches the position at which the work 3 starts rising shown in FIG. 3C from the position in working shown in FIG. 3B, that is, until the proximity sensor 18 shown in FIG. 4 reaches the position of the proximity sensor 20c from the position of the proximity sensor 20b, there is a high possibility of interrupting rotation of the rotary work lifter 1 by pinching the work piece between the free bearing 1c or the spacer 1d and the work support attaching plate 13 or the chute 16. Therefore, in such a case, operation of the rotary work lifter 1 needs to stop at an early stage.

Meanwhile, although interruption of rotation of the rotary work lifter 1 by pinching the work piece does not occur until the rotary work lifter 1 reaches the position of carrying out and in the work 3 shown in FIG. 3A from the position at which the work 3 starts rising shown in FIG. 3C, it is not that the occurrence of interruption is not brought about at all. Further, there is also conceivable a situation in which an unexpected weight is applied to the work 3 after having been finished to work and the work 3 cannot be lifted by the rotary work lifter 1. Therefore, it is preferable to detect the situation of rotating the rotary work lifter 1 at any time also during a time period in which the rotary work lifter 1 is rotated from the position of lifting the work 3 to the position of carrying out and in the work 3.

Next, an explanation will be given of operation and control of the rotary work lifter according to Embodiment 1 for embodying the invention.

In FIG. 6, the rotary actuator 8 constituting the drive source of the rotary work lifter 1 is controlled to operate to start rotating, stop rotating, or switch a rotational direction by a drive source control portion 30. There are a case in which the operational control is carried out manually by an operator and a case in which the operational control is automatically carried out by a program inputted to the drive source control portion 30. The rotary actuator 8 is connected with the above-described combination of the light chopper 19 and the photo sensor 21 and a pulse period measuring instrument 32 for calculating the time interval of the outputted pulse from the photo sensor 21 as speed detecting means 31 for detecting the rotational speed of the rotary actuator 8. An output of the pulse period measuring apparatus 32 is transmitted to a speed determining portion 33 to compare with a set value at the speed determining portion 33, thereby, it is determined whether rotation of the rotary work lifter is to be stopped, and when the rotation is stopped, a stop signal is transmitted to the drive source control portion 30 and the drive source control portion 30 stops rotating the rotary actuator. Meanwhile, the rotary actuator 8 is connected with the above-described proximity sensors 20a, 20b, 20c as position detecting means 34 for detecting a rotational position of the rotary actuator 8. An output of the proximity sensors 20a, 20b, 20c is transmitted to a position determining portion 35 to determine whether the rotary work lifter reaches a predetermined position at the position determining portion 35, and when the rotary work lifter reaches the predetermined position, the stop signal is transmitted to the drive source control portion 30 and the drive source control portion 30 stops rotating the rotary actuator.

Next, a flow of operation will be explained. In FIG. 7, after working has been finished, in order to rotate the rotary work lifter 1 to the position of carrying in and out the work to be able to carryout the work, the drive source control portion 30 rotates the rotary actuator 8 by an input of the operator or automatic operation by the program (step S01). The position determining portion 35 determines whether the rotary work lifter 1 reaches the position of lifting the work by whether the proximity sensor 20c constituting the position detecting means 31 for detecting the position of lifting the work is made ON (step S02). During a time period until the proximity sensor 20c is made ON at step S02, the time interval of the output pulse of the photo sensor 21 which is a value substituting for the rotational speed of the rotary work lifter detected by the speed detecting means 31 is compared with a predetermined value t1 by which the rotary work lifter or the like is not finally destructed at the speed determining portion 33 to determine whether the rotary work lifter is normally rotated (step S03). When the speed of the rotary work lifter is equal or larger than a predetermined speed, that is, when the time interval of the output pulse of the speed detecting means 31 becomes equal to or smaller than the predetermine value t1, it is determined that the rotary work lifter is rotated without a problem and step S02 is executed again. When the proximity sensor 20c is made ON, it is determined that the rotary work lifter 1 can be rotated to the position of lifting the work without a hindrance of pinching the work piece or the like, successively, it is determined whether the position of carrying out and in the work is reached by whether the proximity sensor 20a is made ON at the position determining portion 35 (step S04). During a time period until the proximity sensor 20a is made ON at step S04, the time interval of the output pulse of the photo sensor 21 constituting the value substituting for the rotational speed of the rotary work lifter detected by the speed detecting means 31 is compared with a predetermined value t2 by which the rotary work lifter or the like is not finally destructed at the speed determining portion 33 to determine whether the rotary work lifter is normally rotated (step S05). When the speed of the rotary work lifter becomes equal to or larger than a predetermined speed, that is, when the time interval of the output pulse of the speed detecting means 31 becomes equal to or smaller than the predetermined value t2, it is determined that the rotary work lifter is rotated without a problem and step S04 is executed again. When the proximity sensor 20a is made ON and it is determined that the rotary work lifter 1 reaches the position of carrying out and in the work at the position determining portion 35, the position determining portion 35 outputs the stop signal to the drive source control portion 30 to stop rotating the rotary work lifter (step S06).

At step S03, when the speed determining portion 33 determines that the rotational speed of the rotary work lifter becomes less than the predetermined speed, that is, the time interval of the output pulse of the speed detecting means 31 becomes larger than the predetermined value t1, there is a possibility of interrupting rotation of the rotary work lifter by pinching the work piece or the like and therefore, the speed determining portion 35 outputs the stop signal to the drive source control portion 30 to stop rotating the rotary work lifter (step S07). When the rotary work lifter is stopped, the operator of the working machine confirms cause of hindrance against rotation of the rotary work lifter and when the hindrance is caused by pinching the work piece, the operator removes the work piece and when the hindrance is caused otherwise, the operator pertinently removes the hindrance (step S08). After operation of removing the hindrance of removing the work piece or the like by the operator, the operator inputs instruction to the drive source control portion 30 to rotate the rotary work lifter again to the position of carrying out and in the work (step S09). Thereafter, the series of operation is executed again from step S02.

At step S05, when the speed determining portion 33 determines that the rotational speed of the rotary work lifter becomes less than the predetermine speed, that is, the time interval of the output pulse of the speed detecting means 31 becomes larger than the predetermined value t2, there is a possibility of interrupting rotation of the rotary work lifter by a hindrance of pinching the work piece or the like or others and therefore, the speed determining portion 35 outputs the stop signal to the drive source control portion 30 to stop rotating the rotary work lifter (step S17). When the rotary work lifter is stopped, the operator of the working machine confirms cause of a hindrance against rotation of the rotary work lifter and when the hindrance is caused by pinching the work piece, the operator removes the work piece and when the hindrance is caused otherwise, the operator pertinently removes the hindrance (step S18). After operation of removing the hindrance of removing the work piece by the operator, the operator inputs instruction to the drive source control portion 30 to rotate the work lifter again to the position of carrying out and in the work (step S19). Thereafter, the series of operations is executed again from step S04.

Here, in a range of rotating the rotary work lifter 2 for lifting the work 3 by the rotary work lifter 1, that is, during a time period until the proximity sensor 20a is made ON after making the proximity sensor 20c ON, in comparison with a time period until the proximity sensor 20c is made ON, a load on the rotary actuator 8 is increased by the mass of the work 3 and the rotational speed of the rotary work lifter 1 is retarded. Therefore, it is preferable to establish t1<t2, that is, to constitute a speed determining value when the work is lifted slower than that when the work is not lifted. Naturally, t1=t2 may be established and the speed may be determined by a constant value during a time period of rotating the rotary work lifter 1 from the position in working to the position in carrying out and in the work, however, the determinant cannot be set to a speed faster than the rotational speed in lifting the work. Because when the work is lifted, the rotation is stopped by the determining portion. Meanwhile, when the determinant is set by constituting a reference by the slow speed in lifting the work, it is also conceivable that in a comparatively fast range of the rotational speed in which the work is not lifted, a time period of reaching destruction by pinching the work piece or the like is short and the destruction is brought about before determining that the rotational speed is retarded to the speed of the determinant and therefore, it is preferable to set respectively pertinent determinants in the range of the fast speed and in the range of the slow speed.

Further, although here, the rotational speed is detected by the time interval of the output pulse of the photo sensor, the invention is not particularly limited to the time interval of the output pulse so far as a value capable of substituting for the speed is present, the determination may be executed by a true speed value by calculating the speed from the time interval, otherwise, for example, a number of pulses during a constant period of time for outputting pulses may be counted.

The invention can stop operating the rotary work lifter when rotation is interrupted by pinching the work piece or the like between the rotary work lifter and the working table or the like, or when rotation is interrupted by some other influence by providing the detecting means and the determining portion. Therefore, it can be prevented that the drive source continues generating the torque even after interrupting rotation of the rotary work lifter and the rotary work lifter or the working table or the like is finally destructed as in the background art. Further, since destruction of the rotary work lifter, the working table or the like can be prevented, expense and time required for repair in destruction can be reduced and a reduction in cost of operating the working machine and promotion of a working efficiency can be realized.

Further, although according to Embodiment 1, the drive source of the rotary work lifter 1 is constituted by the rotary actuator 8, the drive source may be constituted by a combination of a straight moving cylinder constituting a power source by fluid pressure and rack & pinion or a motor constituting a power source by electricity.

Further, although according to Embodiment 1, means for detecting the situation of rotating the rotary work lifter 2 at any time is constituted by the combination of the photo sensor 21 and light chopper 19, a similar effect is achieved by attaching a rotary encoder to the rotating shaft 17 of the rotary actuator and detecting and comparing a time interval of a pulse outputted from the rotary encoder.

Further, although according to Embodiment 1, the means for detecting the situation of rotating the rotary work lifter 1 at any time it is attached to the rotary actuator 8, the means may be attached to the rotating shaft of the rotary work lifter 1. In this case, the determinants t1 and t2 of the time interval of the output pulse of the photo sensor 21 need to be changed pertinently in view of a relationship of a gear ratio of the sprocket 9 and the sprocket 6.

Meanwhile, although according to Embodiment 1, an explanation has been given of the constitution of the rotary work lifter according to the invention by taking an example of a case of rotating the rotary work lifter from the position in working to a position in carrying out and in the work, naturally, also when the rotary work lifter is rotated from the position in carrying out and in the work to the position in working the work, a quite similar effects is naturally achieved by constructing the similar constitution and executing the similar control. Although an explanation will be given by taking an example of a case in which the rotary work lifter is rotated from the position in working to the position in carrying out and in the work also in the following embodiments, an effect similar to the above-described is achieved by rotating the rotary work lifter in a reverse direction.

Embodiment 2

Figure 8:
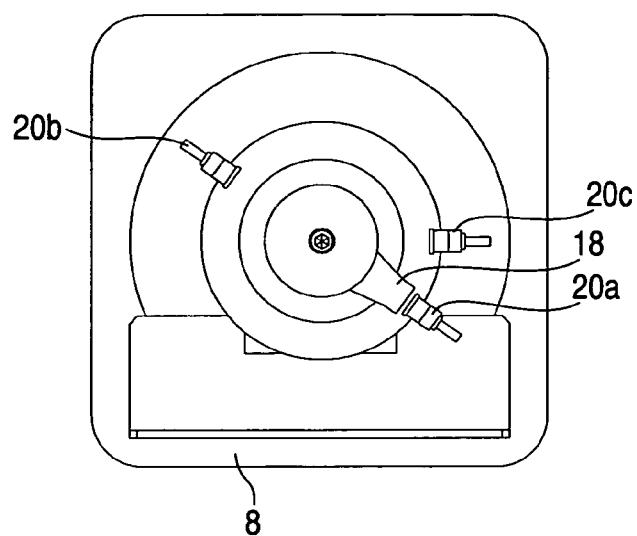
FIG. 8 is a front enlarged view showing a rotary work lifter showing Embodiment 2 of the invention viewed in a direction the same as that of FIG. 4.
Figure 9:
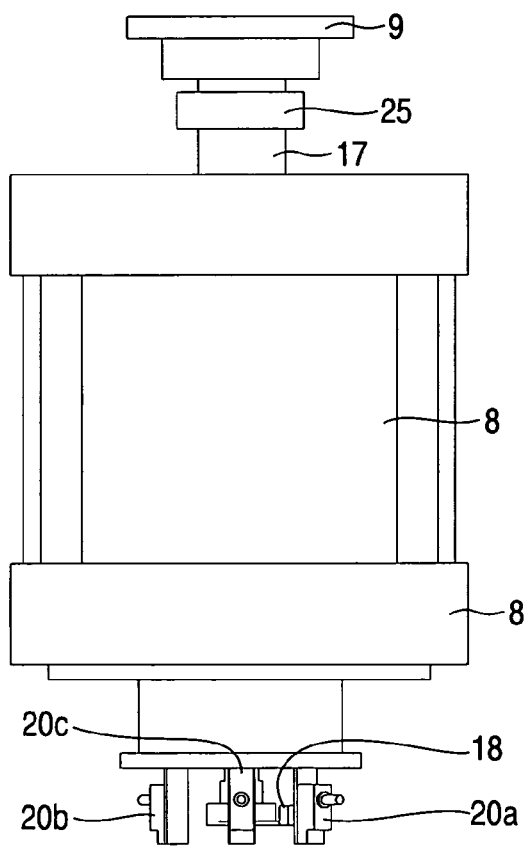
FIG. 9 is a side enlarged view showing the rotary work lifter showing Embodiment 2 of the invention viewed in a direction the same as that of FIG. 5.
Figure 10:
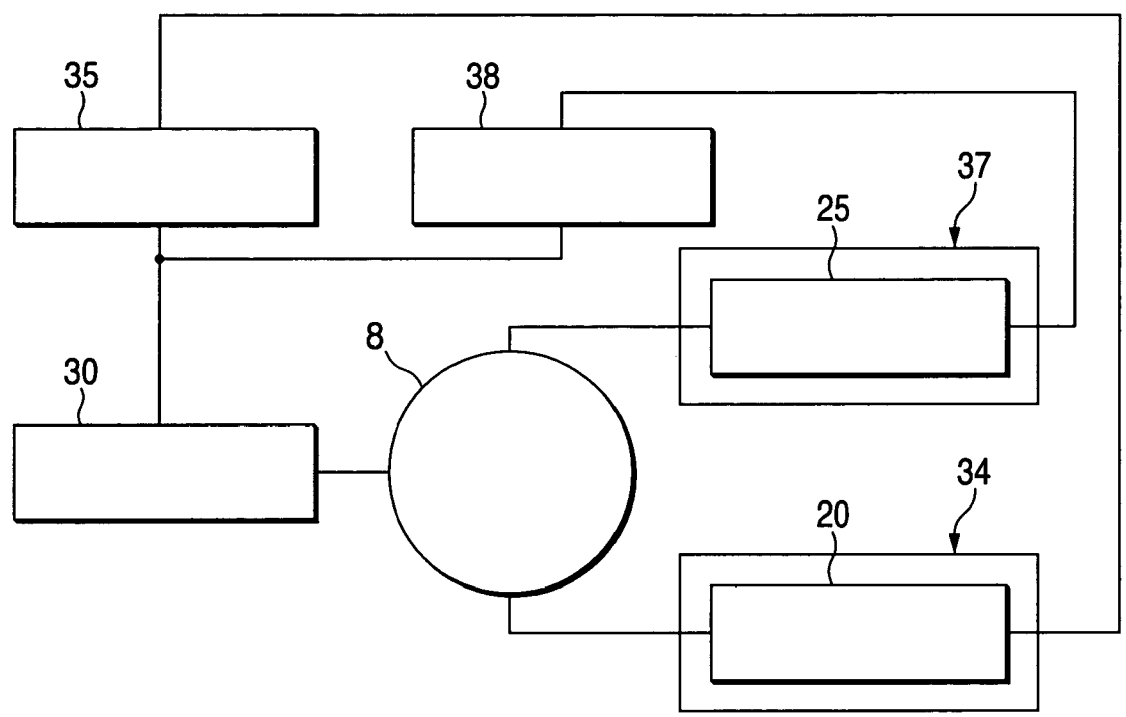
FIG. 10 is a block diagram showing a control portion of the rotary work lifter showing Embodiment 2 of the invention.
Figure 11:
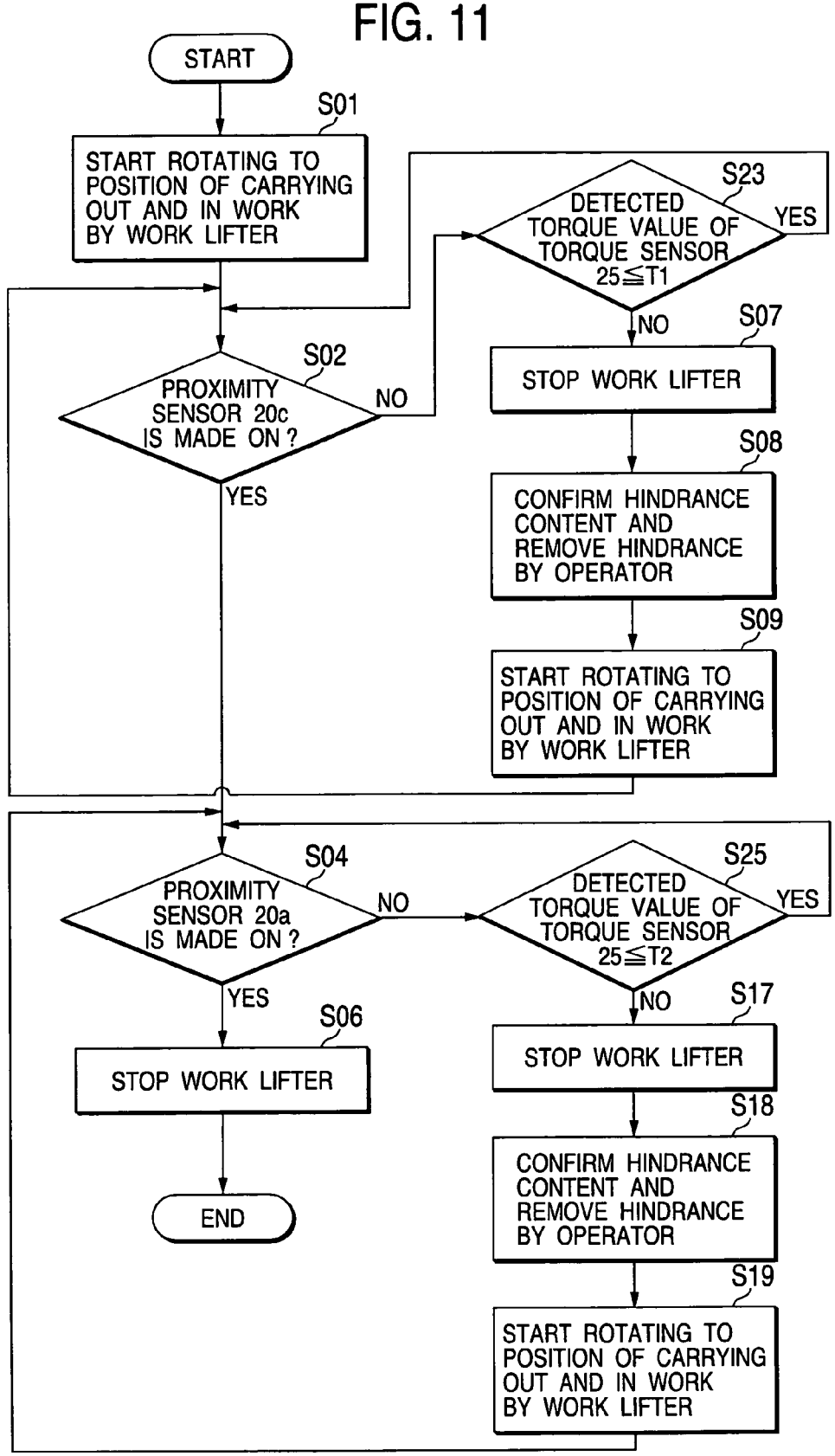
FIG. 11 is a flowchart showing a control method of the rotary work lifter showing Embodiment 2 of the invention.

Whereas according to Embodiment 1, the situation of rotating the rotary work lifter is detected by the combination of the light chopper and the photo sensor, according to Embodiment 2, the situation of rotating the rotary work lifter is detected by a rotational load of the rotary work lifter. Embodiment 2 is constructed by a constitution substantially the same as that of Embodiment 1 with regard to FIG. 1 and FIG. 2. FIG. 8 shows a rotary work lifter according to Embodiment 2 for embodying the invention and is a front view of detecting means at a rotational position of the rotary work lifter viewed from a direction similar that of FIG. 4 of Embodiment 1. FIG. 9 is a side view of means for detecting the rotational position and the rotational load in the rotary work lifter viewed from a direction similar to that of FIG. 5 of Embodiment 1. FIG. 10 is a block diagram showing a control portion of the rotary work lifter according to Embodiment 2 for embodying the invention. FIG. 11 is a flowchart showing a control method of the control portion.

In FIG. 8 and FIG. 9, the rotating shaft 17 and the sprocket 9 of the rotary actuator 8 are connected via a torque sensor 25, and the proximity sensor dog 18 is attached to the side opposed to the side connected with the sprocket 9 of the rotating shaft 17 similar to Embodiment 1 and is rotated along with the rotating shaft 17. However, according to the embodiment, the light chopper 19 is not provided. At the surrounding of the proximity sensor dog 18, the three proximity sensors 20a, 20b, 20c positions of which are fixed are arranged on the rotational circumference of the proximity sensor dog 18 at the positions similar to those of Embodiment 1.

The effect of the proximity sensors 20a, 20b, 20c is similar to that of Embodiment 1. As an effect of the torque sensor 25, the torque generated by the rotary actuator 8 can be detected at any time as a load for rotating the rotary work lifter 1.

As described above, in the case in which it is detected that the torque generated by the rotary actuator 8 is abnormally increased until the rotary work lifter 1 reaches the position at which the work 3 starts rising as shown by FIG. 3C from a position in working shown in FIG. 3B, that is, the proximity sensor dog 18 shown in FIG. 4 reaches the position of the proximity sensor 20c from the position of the proximity sensor 20b by detecting the torque of the rotary actuator 8 constituting the drive source of the rotary work lifter 1 at any time while detecting the position of the rotary work lifter 1 by the proximity sensors 20a, 20b, 20c, it can be regarded that there is a high possibility of abnormally increasing the load for rotating the rotary work lifter 1 by pinching the work piece between the free bearing 1c or the spacer 1d and the work support attaching plate 1b or the chute 16. Therefore, in such a case, operation of the rotary work lifter 1 needs to stop at an early stage.

Naturally, it is preferable to detect the situation of rotating the rotary work lifter 1 at any time until the rotary work lifter 1 reaches the position of carrying out and in the work 3 shown in FIG. 3A from the position at which the work 3 starts rising shown in FIG. 3C, that is, the proximity sensor dog 18 shown in FIG. 4 reaches the position of the proximity sensor 20a from the position of the proximity sensor 20c similar to Embodiment 1.

Next, an explanation will be given of control of the rotary work lifter according to Embodiment 2 for embodying the invention.

In FIG. 9, the rotary actuator 8 constituting a drive source of the rotary work lifter 1 is controlled to operate to start rotating, stop rotating, changing the rotational direction or the like by the drive source control portion 30. The rotary actuator 8 is connected with the above-described torque sensor 25 as load detecting means 37 for detecting operation of rotating the rotary actuator 8. An output of the torque sensor 25 is transmitted to a load determining portion 38 to compare with a set value at the load determining portion 38 to thereby determine whether rotation of the rotary work lifter is stopped, and when the rotation is stopped, a stop signal is transmitted to the drive source control portion 30 and the drive source control portion 30 stops rotating the rotary actuator. Meanwhile, with regard to the position detecting means 34 and the position determining portion 35 with regard to the rotational position of the rotary actuator 8, constitutions similar to those of Embodiment 1 are constructed.

A flow of control of the rotary work lifter according to Embodiment 2 is substantially similar to that of Embodiment 1. A point of difference will be explained in reference to FIG. 11. Although according to Embodiment 1, the situation of rotating the rotary work lifter is determined at steps S03 and S05, according to Embodiment 2, instead of the step S03, new steps S23 and S25 are executed.

In FIG. 11, during a time period until the proximity sensor 20c is made ON at step S02, the load of operation of rotating the rotary work lifter detected by the load detecting means 37 is compared with a predetermined load T1 by which the rotary work lifter or the like is not finally destructed at the load determining portion 38 to thereby determine whether the rotary work lifter is normally operated (step S23). When the load is equal to or smaller than the predetermined load T1, it is determined that the rotary work lifter is operated without a problem to execute step S02 again. When the load determining portion 38 determines that the load operating to rotate the rotary work lifter exceeds the predetermined load T1 at step S23, there is a possibility that an abnormal load is generated by interrupting rotation of the rotary work lifter by pinching the work piece or the like and therefore, the load determining portion 38 outputs a stop signal to the drive source control portion 30 to stop rotating the rotary work lifter (step S07).

During a time period until the proximity sensor 20a is made ON at step S04, the load of operating to rotate the rotary work lifter detected by the load detecting means 37 is compared with a predetermined load T2 by which the rotary work lifter or the like is not finally destructed at the load determining portion 38 to determine whether the rotary work lifter is normally operated (step S25). When the load is equal or smaller than the predetermined load T2, it is determined that the rotary work lifter is operated without a problem to execute step S04 again. When the load determining portion 38 determines that the load of operating to rotate the rotary work lifter exceeds the predetermined load T2 at step S25, there is a possibility that an abnormal load is generated by interrupting rotation of the rotary work lifter by hindrance of pinching the work piece or the like and therefore, the load determining portion 38 outputs the stop signal to the drive source control portion 38 to stop rotating the rotary work lifter (step S17).

The other steps are similar to those of Embodiment 1.

Here, in a range of rotating the rotary work lifter 2 for making the work 3 rise by the rotary work lifter 1, that is, during a time period until the proximity sensor 20a is made ON after the proximity sensor 20c is made ON, in comparison with a time period until the proximity sensor 20c is made ON, the load on the rotary actuator 8 is increased by the mass of the work 3 and therefore, it is preferable to establish T1<T2, that is, to constitute a load determinant when the work piece is made to rise higher than that when the work is not made to rise. Naturally, T1=T2 may be established and the speed may be determined by a constant value during a time period until the rotary work lifter 1 is rotated to the position in carrying out and in the work from the position in working, the determinant cannot be set to a load smaller than a load when the work is lifted. Because when the work is lifted, rotation is stopped by the determining portion. Meanwhile, when the determinant is set by constituting a reference by a large load in lifting the work, there is also conceivable a case in which in a range in which a load when the work is not lifted is comparatively small, the rotary work lifter is rotated by a load smaller than the determinant to destruct. For example, although in lifting the work, the load is applied by dispersing the weight of the work to a plurality of the rotary work lifters and therefore, the total load is large, a load on the individual rotary work lifter does not finally destruct the individual rotary work lifter. However, when the load is generated only on the single rotary work lifter as shown by FIG. 3D, there is conceivable a case in which even when the load which finally destructs the rotary work lifter is generated, as a load of a total of the rotary work lifters, such a load is equal to or smaller than a load in lifting the work. Therefore, it is preferable to set respective pertinent determinants in a range of a large load and a range of a small load.

Embodiment 2 can achieve an effect similar to that of Embodiment 1 by substituting the load setting means and the load determining portion respectively for the speed detecting means and the speed determining portion according to Embodiment 1.

Further, a direct cause of destructing the rotary work lifter or the working table is the load, and even when the load is, for example, a load which does not destruct the rotary work lifter or the like, there is also a possibility of retarding the speed of the rotary work lifter more than the determinant. For example, in the case of the rotary actuator, when fluid pressure of the power source is low, there is a possibility of generating the above-described situation. In such a case, when the determination is carried out by the rotational speed, the rotation is stopped regardless of destruction and loss time of operation is brought about. Therefore, by detecting not the rotational speed of the rotary work lifter but the load, an operational efficiency can be promoted more than that of Embodiment 1.

Further, although according to Embodiment 2, the torque sensor 25 is attached to the rotary actuator 8, the torque sensor 25 may be attached to the rotating shaft of the rotary work lifter 1 other than that of the rotary actuator 8.

Further, although according to Embodiment 2, means for detecting the load for rotating the rotary work lifter 1 is constituted by the torque sensor 25, in the case of the rotary actuator 8 constituting the power source by fluid pressure of air pressure or oil pressure, when the load for rotating the rotary work lifter 1 is increased, the fluid pressure of the power source is increased and therefore, a pressure sensor for detecting the fluid pressure may be made to constitute means for detecting the load for rotating the rotary work lifter 1. Further, when a motor constituting the power source by electricity is made to constitute the drive source of the rotary work lifter 1, when the load for rotating the rotary work lifter 1 is increased, a current value thereof is increased and therefore, an ammeter for detecting the current may constitute means for detecting the load for rotating the rotary work lifter 1. In these cases, when the pressure sensor detects an abnormal increase in pressure, or when the ammeter detects an abnormal increase in current, there is a high possibility of abnormally increasing the load for rotating the rotary work lifter 1 by pinching the work piece or the like and by stopping to operate the rotary work lifter 1 by a flow similar to that of FIG. 11, an effect similar to that of Embodiment 2 is achieved.

Embodiment 3

Meanwhile, the light chopper 19 adopted in Embodiment 1 is provided with the slits at equal intervals and therefore, the rotary actuator 8 is rotated by a constant angle at each output pulse of the photo sensor 21 and the rotational angle of the rotary actuator 8, that is, the rotational angle of the rotary work lifter 1 can be detected from a number of times of the output pulses of the photo sensor 21 at any time. Therefore, operation of both of the speed detecting means and the position detecting means can be carried out by the photo sensor 21.

Figure 12:
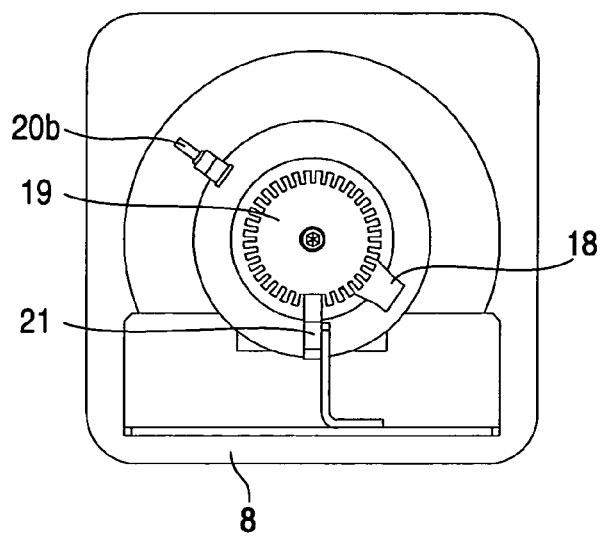
FIG. 12 is a front enlarged view showing a rotary work lifter showing Embodiment 3 of the invention viewed in a direction the same as that of FIG. 4.
Figure 13:
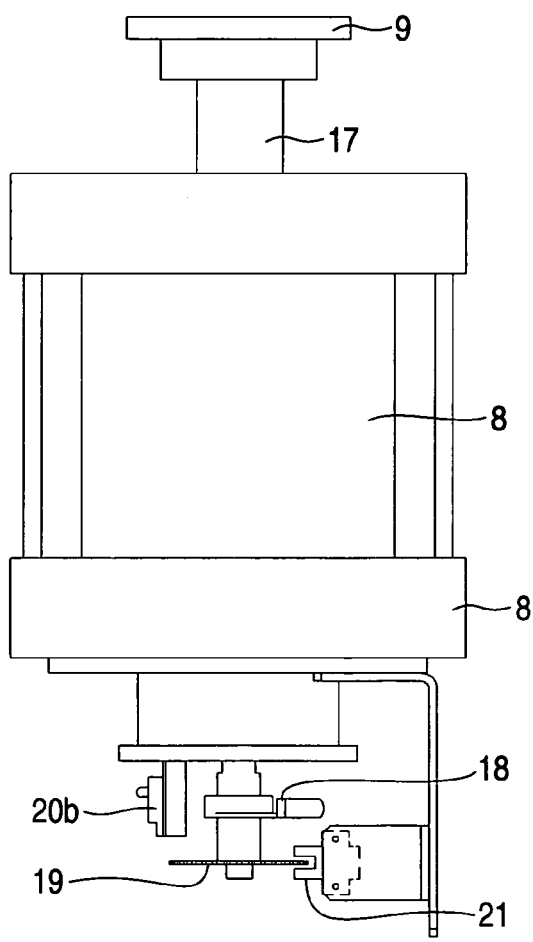
FIG. 13 is a side enlarged view showing the rotary work lifter showing Embodiment 3 of the invention viewed in a direction the same as that of FIG. 5.
Figure 14:
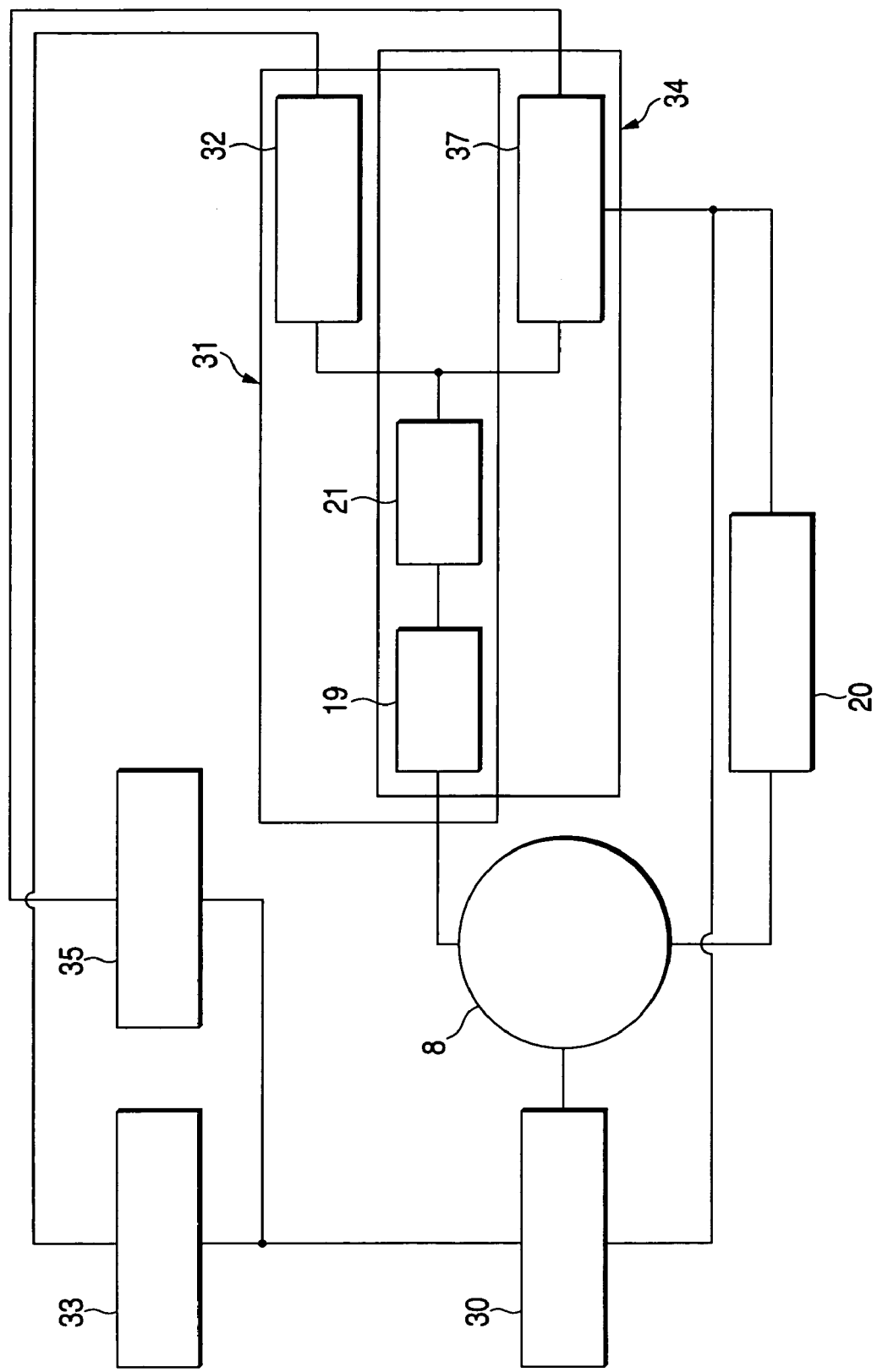
FIG. 14 is a block diagram showing a control portion of the rotary work lifter showing Embodiment 3 of the invention.

FIG. 12 shows a rotary work lifter according to Embodiment 3 for embodying the invention and is a front view of means for detecting a rotational position and a rotational speed of a rotary work lifter viewed from a direction similar to that of FIG. 4 of Embodiment 1. FIG. 13 is a side view of the means for detecting the rotational position and the rotational speed of the rotary work lifter viewed from a direction similar to that of FIG. 5 of Embodiment 1. FIG. 14 is a block diagram showing a control portion of the rotary work lifter according to Embodiment 3 for embodying the invention. FIG. 11 is the flowchart showing a control method of the control portion.

In FIG. 12 and FIG. 13, a side opposed to a side of attaching the sprocket 9 of the rotating shaft 17 of the rotary actuator 8 is attached with the proximity sensor dog 18 and the light chopper 19 similar to Embodiment 1 and is rotated along with the rotating shaft 17. At a surrounding of the proximity sensor dog 18, only a single one of the proximity sensor 20b the position of which is fixed is arranged at a location similar to that of Embodiment 1. Further, the photo sensor 21 is arranged similar to Embodiment 1 by fixing a position thereof to interpose the light chopper 19.

By such a constitution, as the effects of the light chopper 19 and the photo sensor 21, by detecting the time interval of the output pulse of the photo sensor 21 similar to Embodiment 1, the rotational speed of rotary work lifter 1 can be detected. Further, according to Embodiment 3, the rotational angle of the rotary work lifter can be detected by counting a number of output pulses of the photo sensor 21. However, only an amount of changing the angle is known by only counting the number of the output pulses and therefore, an original point needs to detect for determining an absolute position. This is the effect of the proximity sensor 20b. The proximity sensor 20b is made ON when a rotary work lifter 1 is disposed at the position in working shown in FIG. 3B and therefore, the absolute position can be determined by constituting the original point by the position and resetting counting of the number of pulses at the position.

As described above, by determining the position of the original point of the rotary work lifter 1 by the proximity sensor 20b, detecting the rotational speed and the change in the rotational angle of the rotary work lifter 1 by the photo sensor 21 at any time, and determining the absolute position by the change in the angle from the position of the original point, until the rotary work lifter 1 starts to make the work 3 rise from the position in working, or until the rotary work lifter 1 reaches the position of carrying out and in the work from the position at which the rotary work lifter 1 starts to make the work 3 rise, it can be detected that rotation of the rotary actuator 8 is interrupted from the time interval of the output pulse of the photo sensor 21. In such a case, it can be regarded that there is a high possibility of interrupting rotation of the rotary work lifter 1 by pinching the work piece or the like and therefore, the operation of the rotary work lifter 1 needs to stop at an early stage.

Next, an explanation will be given of control of the rotary work lifter according to Embodiment 3 for embodying the invention.

In FIG. 14, the rotary actuator 8 constituting the drive source of the rotary work lifter 1 is controlled to operate to start rotating, stop rotating, switching the rotational direction or the like by the drive source control portion 30. The speed detecting means 31 and the speed determining portion 33 with regard to the rotational speed of the rotary actuator 8 are constructed by constitutions similar to those of Embodiment 1. Meanwhile, position detecting means 34 with regard to the rotational position of rotary actuator 8 serves also as the light chopper 19 and the photo sensor 21 constituting the speed detecting means 31 and is constituted by the light chopper 19, the photo sensor 21 and a counter 37 for counting a number of output pulses of the photo sensor 21. Further, the position of the original point is detected by making the proximity sensor 20b ON and the count number of the counter 21 is reset when the proximity sensor 20b is made ON. A number of counting the counter 21 by rotating the rotary work lifter after resetting coincide with the amount of changing the angle from the position of the original point and therefore, the value is outputted to the position determining portion 35 to determine whether the predetermined position is reached by the position determining portion 35. For example, when a number of pulses counted when the rotary work lifter is rotated from the original point, that is, the position of FIG. 3B to the position of FIG. 3C is n1, whether the position of FIG. 3C is reached can be determined by whether a number of output pulses reaches n1. Further, when the rotary actuator 8 is rotated reversely by instruction of the drive source control portion 30, by controlling the counter 21 by the drive control portion 30 such that the counter 21 counts the pulses by reducing the count number, the absolute position can always be detected even when the rotary actuator 8 is rotated reversely.

A flow of control of the rotary work lifter according to Embodiment 3 is basically similar to that of Embodiment 1. A point of difference will be explained in reference to FIG. 15. Although according to Embodiment 1, the rotational angle of the rotary work lifter is determined at steps S02, S04, according to Embodiment 2, in place of the steps S02, S04, new steps S32, S34 are executed.

Figure 15:
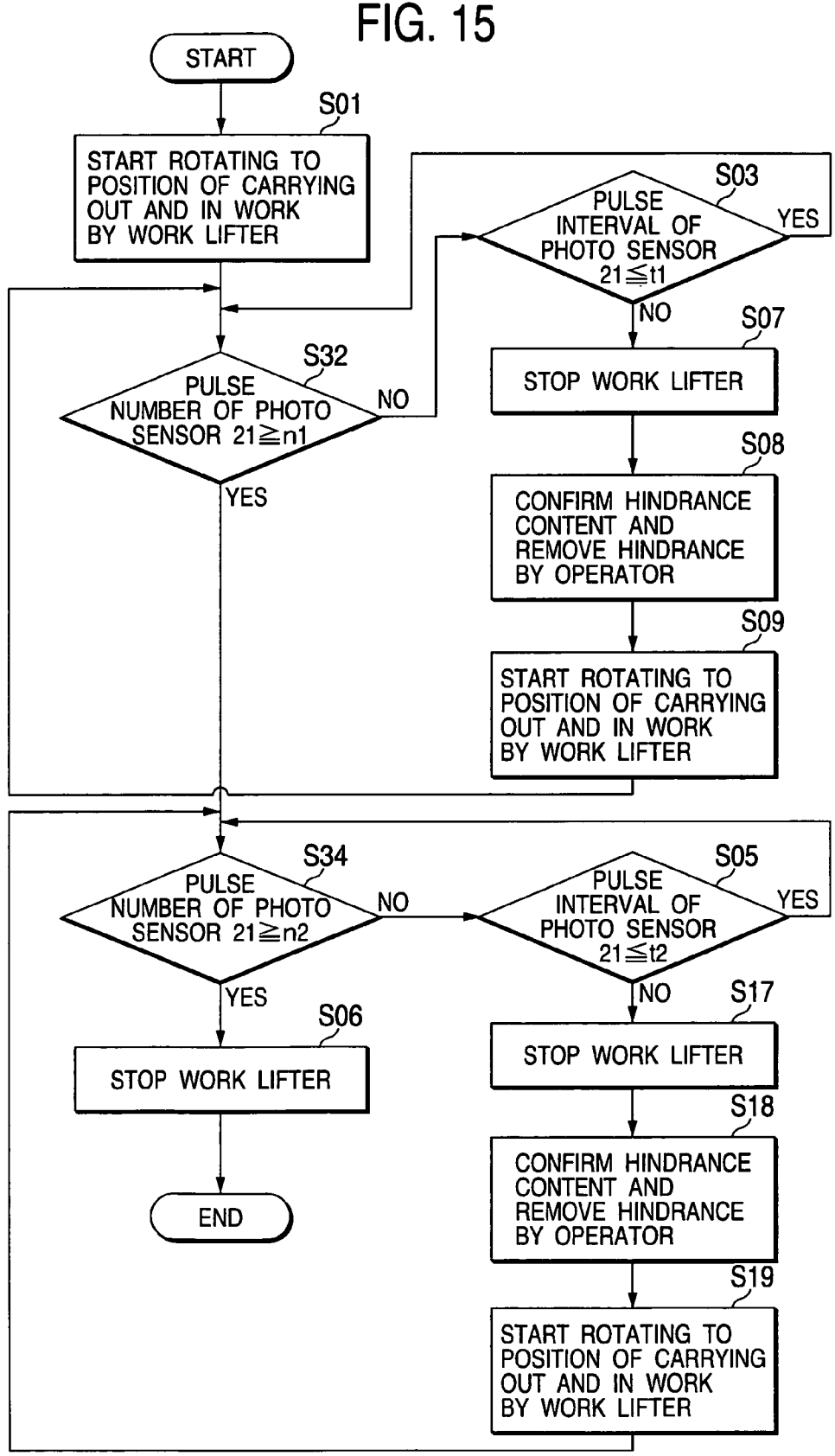
FIG. 15 is a flowchart showing a control method of the rotary work lifter showing Embodiment 3 of the invention.

In FIG. 15, the position determining portion 35 determines whether the rotary work lifter 1 reaches the position of lifting the work by whether the count number of the counter 37 constituting the position detecting means 31 becomes equal to or larger than the count number n1 until reach the position of capable of lifting the work from the original point (step S32). During a time period until the count number becomes equal to or larger than n1 at step S32, the time interval of the output pulse of the photo sensor 21 constituting a value substituting for the rotational speed of the rotary work lifter detected by the speed detecting means 31 is compared with the predetermined value t1 by which the rotary work lifter or the like is not finally destructed at the speed determining portion 33 to determine whether the rotary work lifter is normally rotated (step S03). When the speed of the rotary work lifter becomes equal to or larger than the predetermined speed, that is, the time interval of the output pulse of the speed detecting means 31 becomes equal to or smaller than the predetermine value t1, it is determined that the rotary work lifter is rotated without a problem to execute again step S32. When the count number of the counter 37 becomes equal to or larger than n1, it is determined that the rotary work lifter 1 can be rotated to the position of capable of lifting the work without a hindrance of pinching the work piece or the like, successively, it is determined whether the position of carrying out and in the work is reached, by whether the count number of the counter 37 becomes equal to or larger than a count number n2 until reaching the position of carrying out and in the work from the original point by the position determining portion 35 (step S34). During a time period in which the count number of the counter 37 becomes equal to or larger than n2 at step S34, the time interval of the output pulse of the photo sensor 21 constituting a value substituting for the rotational speed of the rotary work lifter defected by the speed detecting means 31 is compared with the predetermined value t2 by which the rotary work lifter or the like is not finally destructed at the speed determining portion 33 to determine whether the rotary work lifter is normally rotated (step S05). The other steps are similar to those of Embodiment 1.

The Embodiment 3 can be operated as the position detecting means by serving also as the photo sensor used in the speed detecting means of Embodiment 1 and counting the output pulse of photo sensor and an effect similar to that of Embodiment 1 can be achieved.

Further, although according to Embodiment 1, the position is detected by the proximity sensor, the proximity sensor can determine only the position of arranging the proximity sensor. When the proximity sensor is intended to determine other position, arrangement of the proximity sensor needs to change. Meanwhile, in the case of Embodiment 3, an arbitrary position can be set by only changing the count number to be determined and the detecting position can simply be changed in comparison with that of Embodiment 1.

Although according to Embodiment 3, the position is detected and the speed is detected by counting the pulse number of the output pulse of the photo sensor 21 and measuring a time interval of the pulse, a similar effect is achieved by processing an output pulse of a rotary encoder attached to the rotating shaft 17 similarly. Further, there may be constructed a constitution by a proximity sensor dog attached to the rotating shaft 17 and a number of proximity sensors arranged at constant angles to fix onto a circumference. In such a case, a speed can be detected by a time interval of making contiguous proximity sensors ON and a position can be detected by which proximity sensor is made ON.

Embodiment 4

According to Embodiment 1, when the rotary work lifter 1 is stopped by pinching the work piece or the like, the working machine operator removes the work piece 15 or the like constituting the hindrance against rotating the rotary work lifter 2 to operate the rotary work lifter 2 to rotate again to the position of carrying out and in the work. In this case, operation of removing the hindrance of the working piece or the like by the working machine operator is always needed to constitute a hindrance against automatic working. It is an object of Embodiment 4 to reduce the hindrance.

A block diagram showing a control portion of the rotary work lifter according to Embodiment 4 is similar to FIG. 6. FIG. 16 is a flowchart showing a control method of the control portion.

According to Embodiment 4, a processing of stopping the rotary work lifter 1 by pinching the work piece is as follows.

When the rotary work lifter 1 is stopped in the midst of rising, the rotary work lifter 1 is reversely rotated by a predetermined time period to stop. The rotary work lifter 1 is regularly rotated again to try to continue to rotate. When the work lifter 1 is stopped again, a series of operation of inversely rotating, stopping and regularly rotating is carried out again. The cycle is carried out by a predetermined number of times, and in the case in which the rotary lifter 1 is stopped in the midst of rising even when the cycle is carried out by the predetermined number of times, a post processing similar to that of Embodiment 1 is executed.

Next, an explanation will be given of control of the rotary work lifter according to Embodiment 4 for embodying the invention. A flow of control of the rotary work lifter according to Embodiment 4 is basically similar to that of Embodiment 1. A point of difference will be explained in reference to FIG. 16.

In FIG. 16, before step S01, variables m, n for holding numbers of times of stopping the rotary work lifter 1 by the drive source control portion 30 are set and the numbers of times are reset to 1 (step S40). At step S07, after the speed becomes equal to or smaller than the determinant and stops until the rotary work lifter 1 lifts the work, the drive control portion 30 determines whether the number n of times of stopping becomes equal to or larger than a set value N (step S41). When the number n of times of stopping is less than the set value N, the drive control portion 30 increases the number n of times of stopping by 1 (step S42). Further, the drive control portion 30 inversely rotates the rotary work lifter by a predetermined time period (step S43) and stops the rotary work lifter 1 after the predetermined time period. Thereafter, the rotary work lifter 1 is rotated again from step S09.

The steps S42 through step S44 are repeated as described above by a certain number of times and when the drive source control portion 30 determines that the number n of times of stopping becomes equal to or larger than the set value N at step S41, step S08 is executed by issuing an alarm to the operator to carry out processings similar to those of Embodiment 1.

After the rotary work lifter 1 lifts the work at step S17 and after the speed becomes to equal to or smaller than the determinant to stop the rotary work lifter 1 until the position in carrying out and in the work is reached, the drive control portion 30 determines whether the number m of times of stopping becomes equal to or larger than a set value M (step S45). When the number m of times of stopping is less than the set value M, the drive control portion 30 increases the number m of times of stopping by 1 (step S46). Further, the drive control portion 30 rotates the rotary work lifter reversely by a predetermined time period (step S47) and stops the rotary work lifter 1 after the predetermined time period (step S48). Thereafter, the rotary work lifter 1 is rotated again from step S19.

When step S46 through step S48 are repeated by a certain number of times as described above, and the drive source control portion 30 determines that the number m of times of stopping becomes equal to or larger than the set value M at step S45, step S18 is executed by issuing an alarm to the operator to carry out processings similar to those Embodiment 1. The other steps are similar to those of Embodiment 1.

Although an explanation has been given here such that according to Embodiment 4, the rotary work lifter is rotated reversely by the certain time period at step S43 and S47, the rotary work lifter may be rotated reversely by, for example, a predetermined angle. With regard to the predetermined angle, a position which can be detected by the position detecting means may pertinently be set. Further, there is conceivable a situation in which the rotary work lifter cannot even be rotated reversely by pinching the work piece and therefore, it is preferable to detect the rotational speed of the rotary work lifter even in reversely rotating the rotary work lifter.

By adopting the above-described processing, in the case in which the work piece is easy to deform or in the case of a state in which the work piece is pinched to a degree by which the work piece can simply be detached, there is a possibility that the work piece can be deformed not to constitute a hindrance by bringing the rotary work lifter 1 in touch with the work piece by several times, or the work piece can be excluded to a location at which the work piece does not constitute a hindrance, and a time period of manual operation of the operator can be reduced, that is, the hindrance against automatic working can be reduced.

Further, although Embodiment 4 constitutes a basis thereof by Embodiment 1, a similar effect is achieved by adding Embodiment 4 to the rotary work lifter described in Embodiment 2 or Embodiment 3.

INDUSTRIAL APPLICABILITY

As described above, the rotary work lifter and the working machine according to the invention are suitable for being used particularly by a plate material working machine of a laser working machine, a gas cutting machine, a plasma cutting machine or the like and plate material working.

The invention claimed is:
1. A rotary work lifter characterized in a rotary work lifter having a drive source an operation of which is controlled by a drive source control portion, driven by the drive source and enabling to carry a work mounted on a working table, said rotary work lifter comprising:
position detecting means for detecting a rotational position of the rotary work lifter;
a position determining portion for determining whether the rotary work lifter reaches a predetermined position by position information detected by the position detecting means;
speed detecting means for detecting a rotational speed of the rotary work lifter; and
a speed determining portion for outputting a signal of stopping the rotary work lifter to the drive source control portion when a speed of the rotary work lifter becomes equal to or smaller than a predetermined speed by speed information detected by the speed detecting means.

2. The rotary work lifter according to claim 1, characterized in that the position determining portion determines whether the rotary work lifter is disposed in either range of a first rotational range in which the rotary work lifter does not lift the work and a second rotational range in which the rotary work lifter lifts the work;
wherein the speed determining portion determines a first speed as the predetermined speed when the rotary work lifter is disposed in the first rotational range and determines a second speed as the predetermined speed when the rotary work lifter is disposed in the second rotational range to thereby individually set the first speed and the second speed.

3. The rotary work lifter according to claim 2, characterized in that the first speed is set at the speed faster than the second speed.

4. The rotary work lifter according to claim 1, characterized in that the position detecting means comprises:
a proximity sensor dog attached to a rotating shaft of the drive source or other rotating shaft rotated in synchronism with the rotating shaft of the drive source; and
a proximity sensor fixed to a position proximate to the proximity sensor dog when the rotary shaft is rotated by a predetermined angle around the rotating shaft attached with the proximity sensor dog.

5. The rotary work lifter according to claim 1, characterized in that the position detecting means comprises:
a light chopper attached to a rotating shaft of the drive source or other rotating shaft rotated in synchronism with the rotating shaft of the drive source;
a photo sensor for detecting light transmitted or blocked by the light chopper; and
a counter for counting a pulse outputted from the photo sensor by rotating the light chopper.

6. The rotary work lifter according to claim 1, characterized in that the position detecting means comprises:
an encoder attached to a rotating shaft of the drive source or other rotating shaft rotated in synchronism with the rotating shaft of the drive source; and
a counter counting a pulse outputted from the encoder by rotating the encoder.

7. The rotary work lifter according to claim 1, characterized in that the speed detecting means comprises:
a light chopper attached to a rotating shaft of the drive source or other rotating shaft rotated in synchronism with the rotating shaft of the drive source;
a photo sensor for detecting light transmitted or blocked by the light chopper; and
a pulse period measuring instrument for measuring a time interval of a pulse outputted from the photo sensor by rotating the light chopper.

8. The rotary work lifter according to claim 1, characterized in that the speed detecting means comprises:
an encoder attached to a rotating shaft of the drive source or other rotating shaft rotated in synchronism with the rotating shaft of the drive source; and a pulse period measuring instrument for measuring a time interval of a pulse outputted from the encoder by rotating the encoder.

9. The rotary work lifter according to claim 1, characterized in that the speed detecting means comprises:
a proximity sensor dog attached to a rotating shaft of the drive source or other rotating shaft rotated in synchronism with the rotating shaft of the drive source; and
proximity sensors arranged at equal intervals on a circumference proximate to the proximity sensor dog when the rotating shaft is rotated around a rotating shaft attached with the proximity sensor dog.

10. The rotary work lifter according to claim 1, characterized in that when the rotary work lifter is stopped by a stop signal outputted from the speed determining portion, the drive source control portion rotates the rotary work lifter in a rotational direction reverse to a rotational direction before stopping the rotary work lifter by a predetermined time period or a predetermined angle, rotates the rotary work lifter again in the original rotational direction, and repeats the series of operation and stops the rotary work lifter when the series of operation is repeated by a predetermined number of times.

11. A working machine characterized in a working machine including a rotary work lifter for enabling to carry a work mounted on a working table, said working machine including the rotary work lifter according to claim 1.

12. The rotary work lifter according to claim 2, characterized in that the position detecting means comprises:
a proximity sensor dog attached to a rotating shaft of the drive source or other rotating shaft rotated in synchronism with the rotating shaft of the drive source; and
a proximity sensor fixed to a position proximate to the proximity sensor dog when the rotary shaft is rotated by a predetermined angle around the rotating shaft attached with the proximity sensor dog.

13. The rotary work lifter according to claim 3, characterized in that the position detecting means comprises:
a proximity sensor dog attached to a rotating shaft of the drive source or other rotating shaft rotated in synchronism with the rotating shaft of the drive source; and
a proximity sensor fixed to a position proximate to the proximity sensor dog when the rotary shaft is rotated by a predetermined angle around the rotating shaft attached with the proximity sensor dog.

14. The rotary work lifter according to claim 2, characterized in that the position detecting means comprises:
a light chopper attached to a rotating shaft of the drive source or other rotating shaft rotated in synchronism with the rotating shaft of the drive source;
a photo sensor for detecting light transmitted or blocked by the light chopper; and
a counter for counting a pulse outputted from the photo sensor by rotating the light chopper.

15. The rotary work lifter according to claim 3, characterized in that the position detecting means comprises:
a light chopper attached to a rotating shaft of the drive source or other rotating shaft rotated in synchronism with the rotating shaft of the drive source;
a photo sensor for detecting light transmitted or blocked by the light chopper; and
a counter for counting a pulse outputted from the photo sensor by rotating the light chopper.

16. The rotary work lifter according to claim 2, characterized in that the position detecting means comprises:
an encoder attached to a rotating shaft of the drive source or other rotating shaft rotated in synchronism with the rotating shaft of the drive source; and
a counter counting a pulse outputted from the encoder by rotating the encoder.

17. The rotary work lifter according to claim 3, characterized in that the position detecting means comprises:
an encoder attached to a rotating shaft of the drive source or other rotating shaft rotated in synchronism with the rotating shaft of the drive source; and
a counter counting a pulse outputted from the encoder by rotating the encoder.

18. The rotary work lifter according to claim 2, characterized in that the speed detecting means comprises:
a light chopper attached to a rotating shaft of the drive source or other rotating shaft rotated in synchronism with the rotating shaft of the drive source;
a photo sensor for detecting light transmitted or blocked by the light chopper; and
a pulse period measuring instrument for measuring a time interval of a pulse outputted from the photo sensor by rotating the light chopper.

19. The rotary work lifter according to claim 3, characterized in that the speed detecting means comprises:
a light chopper attached to a rotating shaft of the drive source or other rotating shaft rotated in synchronism with the rotating shaft of the drive source;
a photo sensor for detecting light transmitted or blocked by the light chopper; and
a pulse period measuring instrument for measuring a time interval of a pulse outputted from the photo sensor by rotating the light chopper.

20. The rotary work lifter according to claim 2, characterized in that the speed detecting means comprises:
an encoder attached to a rotating shaft of the drive source or other rotating shaft rotated in synchronism with the rotating shaft of the drive source; and
a pulse period measuring instrument for measuring a time interval of a pulse outputted from the encoder by rotating the encoder.

21. The rotary work lifter according to claim 3, characterized in that the speed detecting means comprises:
an encoder attached to a rotating shaft of the drive source or other rotating shaft rotated in synchronism with the rotating shaft of the drive source; and
a pulse period measuring instrument for measuring a time interval of a pulse outputted from the encoder by rotating the encoder.

22. The rotary work lifter according to claim 2, characterized in that the speed detecting means comprises:
a proximity sensor dog attached to a rotating shaft of the drive source or other rotating shaft rotated in synchronism with the rotating shaft of the drive source; and
proximity sensors arranged at equal intervals on a circumference proximate to the proximity sensor dog when the rotating shaft is rotated around a rotating shaft attached with the proximity sensor dog.

23. The rotary work lifter according to claim 3, characterized in that the speed detecting means comprises:
a proximity sensor dog attached to a rotating shaft of the drive source or other rotating shaft rotated in synchronism with the rotating shaft of the drive source; and
proximity sensors arranged at equal intervals on a circumference proximate to the proximity sensor dog when the rotating shaft is rotated around a rotating shaft attached with the proximity sensor dog.

24. The rotary work lifter according to claim 2, characterized in that when the rotary work lifter is stopped by a stop signal outputted from the speed determining portion, the drive source control portion rotates the rotary work lifter in a rotational direction reverse to a rotational direction before stopping the rotary work lifter by a predetermined time period or a predetermined angle, rotates the rotary work lifter again in the original rotational direction, and repeats the series of operation and stops the rotary work lifter when the series of operation is repeated by a predetermined number of times.

25. The rotary work lifter according to claim 3, characterized in that when the rotary work lifter is stopped by a stop signal outputted from the speed determining portion, the drive source control portion rotates the rotary work lifter in a rotational direction reverse to a rotational direction before stopping the rotary work lifter by a predetermined time period or a predetermined angle, rotates the rotary work lifter again in the original rotational direction, and repeats the series of operation and stops the rotary work lifter when the series of operation is repeated by a predetermined number of times.

26. A working machine characterized in a working machine including a rotary work lifter for enabling to carry a work mounted on a working table, said working machine including the rotary work lifter according to claim 2.

27. A working machine characterized in a working machine including a rotary work lifter for enabling to carry a work mounted on a working table, said working machine including the rotary work lifter according to claim 3.

* * * * *